(12) United States Patent
Bert et al.

(10) Patent No.: US 9,182,912 B2
(45) Date of Patent: Nov. 10, 2015

(54) METHOD TO ALLOW STORAGE CACHE ACCELERATION WHEN THE SLOW TIER IS ON INDEPENDENT CONTROLLER

(75) Inventors: Luca Bert, Cumming, GA (US); Mark Ish, Sandy Springs, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 585 days.

(21) Appl. No.: 13/197,009

(22) Filed: Aug. 3, 2011

(65) Prior Publication Data

US 2013/0036265 A1 Feb. 7, 2013

(51) Int. Cl.
*G06F 12/10* (2006.01)
*G06F 3/06* (2006.01)
*G06F 12/08* (2006.01)

(52) U.S. Cl.
CPC ............ *G06F 3/0611* (2013.01); *G06F 3/0656* (2013.01); *G06F 3/0685* (2013.01); *G06F 12/0866* (2013.01); *G06F 12/0897* (2013.01); *G06F 2212/221* (2013.01); *G06F 2212/222* (2013.01); *G06F 2212/284* (2013.01)

(58) Field of Classification Search
CPC .... G06F 12/08; G06F 12/0802; G06F 3/0611
USPC .......................................................... 711/117
See application file for complete search history.

(56) References Cited

U.S. PATENT DOCUMENTS

| | | | |
|---|---|---|---|
| 2003/0110357 A1* | 6/2003 | Nguyen et al. ................ | 711/136 |
| 2004/0117496 A1 | 6/2004 | Mittal et al. | |
| 2009/0240869 A1* | 9/2009 | O'Krafka et al. ............. | 711/103 |
| 2010/0318734 A1 | 12/2010 | Vaid et al. | |

* cited by examiner

*Primary Examiner* — Jae Yu
(74) *Attorney, Agent, or Firm* — Suiter Swantz pc llo

(57) ABSTRACT

The present invention is directed to a method for providing storage acceleration in a data storage system. In the data storage system described herein, multiple independent controllers may be utilized, such that a first storage controller may be connected to a first storage tier (ex.—a fast tier) which includes a solid-state drive, while a second storage controller may be connected to a second storage tier (ex.—a slower tier) which includes a hard disk drive. The accelerator functionality may be split between the host of the system and the first storage controller of the system (ex.—some of the accelerator functionality may be offloaded to the first storage controller) for promoting improved storage acceleration performance within the system.

19 Claims, 2 Drawing Sheets

METHOD TO ALLOW STORAGE CACHE ACCELERATION WHEN THE SLOW TIER IS ON INDEPENDENT CONTROLLER

FIELD OF THE INVENTION

The present invention relates to the field of data management via data storage systems (ex.—external, internal/Direct-Attached Storage (DAS), Redundant Array of Inexpensive Disks (RAID), software, enclosures, Network-Attached Storage (NAS) and Storage Area Network (SAN) systems and networks) and particularly to a method to allow storage cache acceleration when the slow tier is on independent controller.

BACKGROUND OF THE INVENTION

Currently available solutions for promoting storage acceleration between a fast storage tier and a slow storage tier of a data storage system may not provide a desirable level of performance.

Therefore, it may be desirable to provide a storage acceleration solution which addresses the shortcomings of currently available solutions.

SUMMARY OF THE INVENTION

Accordingly, an embodiment of the present disclosure is directed to a method for providing storage acceleration in a data storage system via a first storage controller of the data storage system, said method including: opening an Application Programming Interface (API) via the first storage controller, the first storage controller being connected to a first storage tier, the first storage tier including a solid-state drive (SSD); receiving a query at the first storage controller, the query being provided to the first storage controller via a host mapper of the system, the query being generated based on a input/output (I/O) command issued by a host of the system, the query requesting read data; when the requested read data is at least one of: located in a cache of the first storage controller, or located on the SSD connected to the first storage controller, retrieving the requested read data and providing the requested read data to the host mapper in response to the query; when the requested read data is not at least one of: located in the cache of the first controller, or located on the SSD connected to the first controller, providing a message to the host mapper indicating a cache miss in response to the query; and when the requested read data is not at least one of: located in the cache of the first controller, or located on the SSD connected to the first controller, and when the requested read data is obtained by the host mapper from a second controller, the second controller being connected to a second storage tier, the second storage tier being a slower storage tier than the first storage tier, the second storage tier including a hard disk drive (HDD), receiving a copy of the requested read data at the first controller.

A further embodiment of the present disclosure is directed to a non-transitory, computer-readable medium having computer-executable instructions for performing a method for providing storage acceleration in a data storage system, said method including: generating a query via a host mapper of the system, the query being based on an input/output (I/O) command issued by a host of the system, the I/O command being a read command, the query including a request for read data; opening an Application Programming Interface (API) via a first storage controller of the system, the first storage controller being connected to a first storage tier, the first storage tier including a solid-state drive (SSD); providing the query to the first controller via the host mapper, the host mapper being connected to a host of the system; receiving the query via the first controller; when the requested read data is at least one of: located in a cache of the first controller, or located on a SSD connected to the first controller, retrieving the requested read data and providing the requested read data to the host mapper in response to the query; when the requested read data is provided by the first controller, receiving the requested read data via the host mapper and directing the requested read data to the host; when the requested read data is not at least one of: located in the cache of the first controller, or located on the SSD connected to the first controller, providing a message to the host mapper indicating a cache miss in response to the query; receiving the cache miss message via the host mapper; in response to receiving the cache miss message from the first controller, providing a request from the host mapper to a second controller for obtaining the requested read data, the second controller being connected to at least one hard disk drive (HDD); when the requested read data is at least one of: located in a cache of the second controller, or located on a hard disk drive (HDD) connected to the second controller, receiving the requested read data from the second controller via the host mapper and directing the requested read data to the host; when the cache miss message indicates to provide a copy of the requested read data obtained from the second controller to the first controller, providing the copy of the requested read data to the first controller via the host mapper; and receiving the copy of the requested read data via the first controller.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Reference will now be made in detail to the presently preferred embodiments of the invention, examples of which are illustrated in the accompanying drawings.

Promoting storage acceleration between fast and slow storage tiers of a data storage system is a current area of innovative focus. A number of solutions are currently available for promoting storage acceleration between fast and slow storage tiers of a data storage system. A first currently-implemented solution involves having a single controller manage (ex.—promoted storage acceleration between) both the fast storage tier and the slow storage tier of the data storage system. For instance, with this first currently-implemented solution, a software program for promoting (ex.—providing, facilitating) storage acceleration between the fast and slow storage tiers may execute upon and entirely within the controller. The advantages of this first currently-implemented solution are that it is very efficient and involves low system usage (ex.—low taxation upon resources of the system). However, a disadvantage of this first currently-implemented solution would be that the class of solutions which may be able to connect to a single controller may be limited.

A second currently-implemented solution involves having a host system manage (ex.—promote storage acceleration between) both the fast storage tier and the slow storage tier of the data storage system. For instance, with this second currently-implemented solution, a software program for promoting (ex.—providing, facilitating) storage acceleration between the fast and slow storage tiers may execute upon and entirely within the host system (ex.—host) and may manage as many different controllers of the data storage system as is necessary. An advantage of this second currently-implemented solution is that it is more flexible than the first currently-implemented solution. However, some disadvantages of this second currently-implemented solution would be that it involves higher system usage (ex.—higher taxation upon the resources of the data storage system) and results in a larger number of latencies compared to the first currently-implemented solution. A further disadvantage is that, since the software program which promotes storage acceleration (ex.—provides storage acceleration functionality) is executing entirely within the host, the code of the software program may be difficult to protect from GNU General Public Licenses (GPL) and other open source licenses.

Therefore, it may be desirable to provide a storage acceleration solution which addresses the above-referenced shortcomings of currently available solutions.

Figure 1:
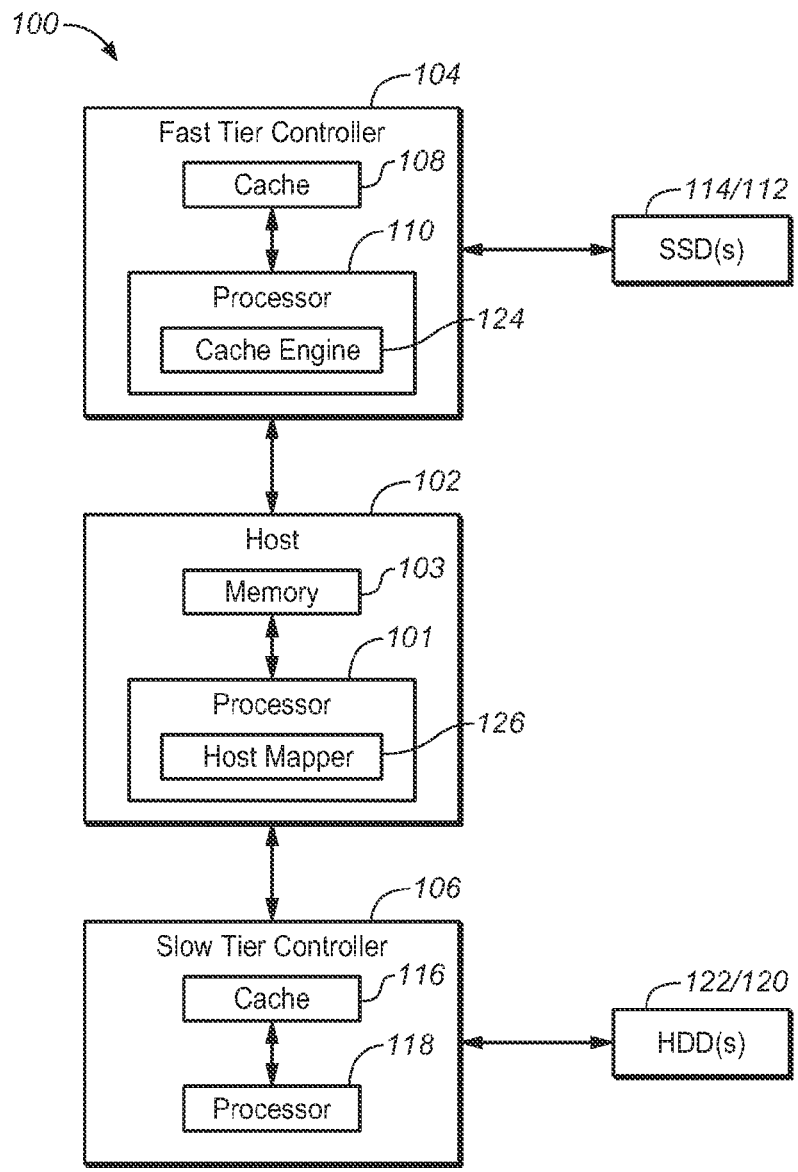
FIG. 1 is a block diagram illustration of a data storage system in accordance with an exemplary embodiment of the present disclosure.

Referring to FIG. 1, a data storage system in accordance with an exemplary embodiment of the present disclosure is shown. In exemplary embodiments, the data storage system 100 may include a host computer system (ex.—a host system; a host; a network host) 102. The host computer system 102 may include a processing unit 101 and a memory 103, the memory 103 being connected to the processing unit 101. In further embodiments, the system 100 may include one or more controllers (ex.—storage controller(s); disk array controller(s); Redundant Array of Independent Disks (RAID) controller(s); Communication Streaming Architecture (CSA) controllers; adapters). For instance, in the embodiment shown in FIG. 1, the data storage system 100 includes a first controller 104 and a second controller 106. In still further embodiments, the first controller 104 and the second controller 106 may be communicatively coupled with the host 102.

In exemplary embodiments of the present disclosure, the first controller 104 may include a memory (ex.—controller cache; cache memory) 108. The first controller 104 may further include a processing unit 110, the processing unit 110 being connected to the cache memory 108. In further embodiments, the first controller 104 may be connected to (ex.—communicatively coupled with) a first storage subsystem (ex.—a first storage tier; a fast tier) 112. For instance, the first storage tier 112 may include one or more solid-state disk drives (ex.—solid-state drives (SSDs)) 114.

In embodiments of the present disclosure, the second controller 106 may include a memory (ex.—controller cache; cache memory) 116. The second controller 106 may further include a processing unit 118, the processing unit 118 being connected to the cache memory 116. In further embodiments, the second controller 106 may be connected to (ex.—communicatively coupled with) a second storage subsystem (ex.—a second storage tier; a slow tier) 120. For instance, the second storage tier 120 may include one or more hard disk drives (HDDs) 122.

In exemplary embodiments, the system 100 may include a cache engine 124. The cache engine 124 may be configured for executing on the processing unit 110 of the first controller 106. In still further embodiments, the system 100 may include a host mapper 126. The host mapper 126 may be configured for executing on the processing unit (ex.—processor) 101 of the host 102. In an embodiment of the present disclosure, the host mapper 126 may be a thin driver layer. The cache engine 124 and host mapper 126 may function cooperatively for promoting storage acceleration for the system 100. The steps by which the cache engine 124 and host mapper 126 may promote storage acceleration for the system 100 are discussed below.

Figure 2:
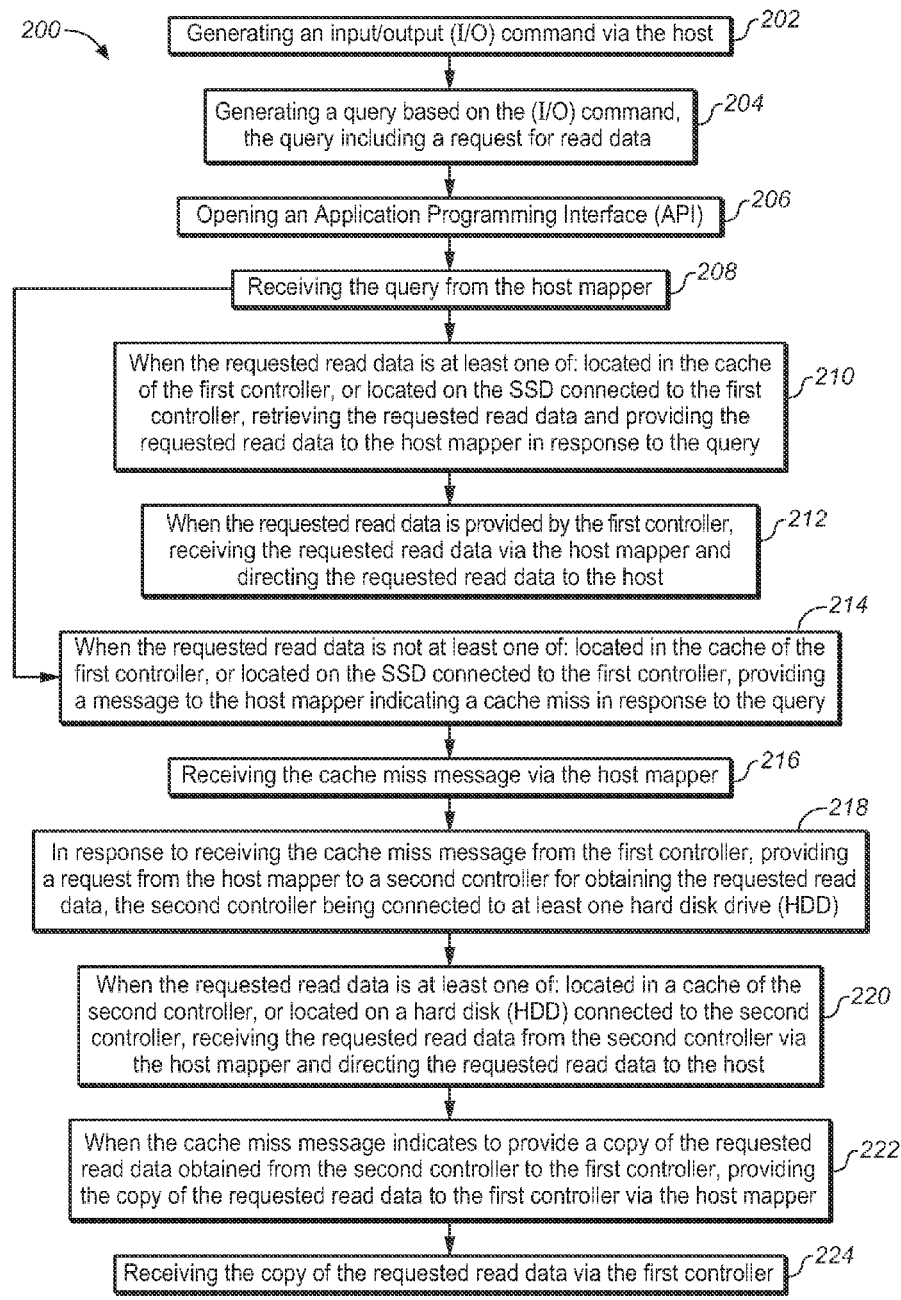
FIG. 2 is a flowchart which illustrates a method for providing storage acceleration in a data storage system (such as the data storage system shown in FIG. 1), in accordance with exemplary embodiments of the present disclosure.

FIG. 2 is a flowchart which illustrates a method for providing storage acceleration in a data storage system. In an exemplary embodiment of the present disclosure, the method 200 may include the step of generating an input/output (I/O) command (ex.—read command) via the host 202. In a further embodiment of the present disclosure, the method 200 may further include the step of generating a query based on the I/O command 204. For example, the host mapper 126 may generate the query based on the I/O command generated by the host 102. In further embodiments of the present disclosure, the method 200 includes the step of opening an Application Programming Interface (API) 206. For example, the first controller 104 may open an API to allow the host (ex.—host layer, host mapper) 102 to query the first controller 104.

In exemplary embodiments of the present disclosure, the method 200 may further include the step of receiving the query from the host mapper 208. For instance, the query, which is received by the first controller 104 and provided from the host mapper 126, may include a message inquiring as to whether at least one of the cache 108 of the first controller 104 or the SSD 114 connected to first controller 104 includes data which was requested in the I/O (ex.—requested read data). In embodiments of the present disclosure, the query may be received by a cache engine 124 of the first controller 104. In further embodiments, the method 200 may include the step of, when the requested read data is at least one of: located in the cache of the first controller, or located on the SSD connected to the first controller, retrieving the requested read data and providing the requested read data to the host mapper in response to the query 210. For instance, when the requested read data is located in the cache 108 of the first controller 104 and/or is located on the SSD 114 connected to the first controller 104, the first controller 104 may (ex.—via its cache engine 124) retrieve the requested read data from the cache 108 and/or the SSD 114 and may provide it to the host mapper 126 in response to the query. In further embodiments, the method 200 may include the step of, when the requested read data is provided by the first controller, receiving the requested read data via the host mapper and directing the requested read data to the host 212.

In an embodiment of the present disclosure, the method 200 may further include the step of: when the requested read data is not at least one of: located in the cache of the first controller, or located on the SSD connected to the first controller, providing a message to the host mapper indicating a cache miss in response to the query 214. For example, when the requested read data is not located in the cache 108 of the first controller 104 and is not located on the SSD 114 connected to the first controller 104, the first controller 104 (ex.—via its cache engine 124) may provide a message to the host mapper 126 indicating that a cache miss has occurred (ex.—cache miss message), the message being provided in response to the query. In further embodiments, the message indicating that a cache miss has occurred may also include an indication that the read data should be requested from a second storage controller (ex.—a slow tier controller) 106. In still further embodiments, the message indicating that a cache miss has occurred may also include an indication that a copy of the requested read data obtained via the second controller 106 is to be provided to the first controller 104.

In exemplary embodiments of the present disclosure, the method 200 may further include the step of receiving the cache miss message via the host mapper 216. The method 200 may further include the step of, in response to receiving the cache miss message from the first controller, providing a request from the host mapper to a second controller for obtaining the requested read data, the second controller being connected to at least one hard disk drive (HDD) 218. For example, the host mapper 126 may provide a request to the second controller (ex.—the slow tier controller) 106 for obtaining the requested read data. In further embodiments, the method 200 may further include the step of, when the requested read data is at least one of: located in a cache of the second controller, or located on a hard disk drive (HDD) connected to the second controller, receiving the requested read data from the second controller via the host mapper and directing the requested read data to the host 220. In still further embodiments, the method 200 may further include the step of, when the cache miss message indicates to provide a copy of the requested read data obtained from the second controller to the first controller, providing the copy of the requested read data to the first controller via the host mapper 222. In further embodiments, the method 200 may further include the step of receiving the copy of the requested read data via the first controller 224. For instance, the copy of the requested read data may be received via the cache engine 124 of the first controller 104.

When implementing the method for providing storage acceleration in a data storage system, as described above, the use of the cache engine 124 on the controller 104 and the use of the host mapper 126 on the host 102 allows for the accelerator functionality to be split across two devices (ex.—the host 102 and the controller 104). Thus, the cache engine 124 on the controller 104 may function as an offload accelerator, and may allow sensitive information to be protected within the controller 104. Further, with the method for providing storage acceleration in a data storage system, as described above, reduced latency may be promoted compared to currently available solutions.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a firmware package and/or a software package. Such a firmware package and/or software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing storage acceleration in a data storage system including at least a first storage tier having a first speed and a second storage tier having a second speed lower than the first speed, said method comprising:
   opening an Application Programming Interface (API) via a first storage controller connected to the first storage tier, the first storage tier including a solid-state drive (SSD);
   receiving a query at the first storage controller, the query being provided to the first storage controller via a host mapper of the system, the query being generated based on a input/output (I/O) command issued by a host of the system, the query requesting read data;
   when the requested read data is at least one of: located in a cache of the first storage controller, or located on the SSD connected to the first storage controller, retrieving the requested read data and providing the requested read data to the host mapper in response to the query; and
   when the requested read data is not at least one of: located on the cache of the first controller or located on the SSD connected to the first controller, and when the requested read data is obtained by the host mapper from a second controller connected to a second storage tier, the second storage tier including a hard disk drive (HDD), receiving a copy of the requested read data at the first controller.

2. A method for providing storage acceleration as claimed in claim 1, the method further comprising:
   when the requested read data is not at least one of: located in the cache of the first controller, or located on the SSD connected to the first controller, providing a message to the host mapper indicating a cache miss in response to the query.

3. A non-transitory, computer-readable medium having computer-executable instructions for performing a method for providing storage acceleration in a data storage system including at least a first storage tier having a first speed and a second storage tier having a second speed lower than the first speed, said method comprising:
   generating a query via a host mapper connected to a host of the system, the query being based on an input/output (I/O) command issued by a host of the system, the I/O command being a read command, the query including a request for read data;

opening an Application Programming Interface (API) via a first storage controller connected to the first storage tier, the first storage tier including a solid-state drive (SSD);

providing the query to the first controller via the host mapper;

receiving the query via the first controller;

when the requested read data is not at least one of: located in the cache of the first controller or located on the SSD connected to the first controller, providing a request from the host mapper to a second controller for obtaining the requested read data, the second controller being connected to the second storage tier, the second storage tier including at least one hard disk drive (HDD).

4. A non-transitory, computer-readable medium having computer-executable instructions for performing a method as claimed in claim 3, said method further comprising:

when the requested read data is at least one of: located in a cache of the first controller, or located on a SSD connected to the first controller, retrieving the requested read data and providing the requested read data to the host mapper in response to the query.

5. A non-transitory, computer-readable medium having computer-executable instructions for performing a method as claimed in claim 4, said method further comprising:

when the requested read data is provided by the first controller, receiving the requested read data via the host mapper and directing the requested read data to the host.

6. A non-transitory, computer-readable medium having computer-executable instructions for performing a method as claimed in claim 3, said method further comprising:

when the requested read data is not at least one of: located in the cache of the first controller, or located on the SSD connected to the first controller, providing a message to the host mapper indicating a cache miss in response to the query.

7. A non-transitory, computer-readable medium having computer-executable instructions for performing a method as claimed in claim 6, said method further comprising:

receiving the cache miss message via the host mapper.

8. A non-transitory, computer-readable medium having computer-executable instructions for performing a method as claimed in claim 7, wherein the providing a request from the host mapper to the second controller for obtaining the requested read data includes:

in response to receiving the cache miss message from the first controller, providing a request from the host mapper to the second controller.

9. A non-transitory, computer-readable medium having computer-executable instructions for performing a method as claimed in claim 8, said method further comprising:

when the requested read data is at least one of: located in a cache of the second controller, or located on a hard disk drive (HDD) connected to the second controller, receiving the requested read data from the second controller via the host mapper and directing the requested read data to the host.

10. A non-transitory, computer-readable medium having computer-executable instructions for performing a method as claimed in claim 9, said method further comprising:

when the cache miss message indicates to provide a copy of the requested read data obtained from the second controller to the first controller, providing the copy of the requested read data to the first controller via the host mapper.

11. A non-transitory, computer-readable medium having computer-executable instructions for performing a method as claimed in claim 10, said method further comprising:

receiving the copy of the requested read data via the first controller.

12. A non-transitory, computer-readable medium having computer-executable instructions for performing a method for providing storage acceleration in a data storage system including at least a first storage tier having a first speed and a second storage tier having a second speed lower than the first speed, said method comprising:

generating a query via a host mapper connected to a host of the system, the query being based on an input/output (I/O) command issued by a host of the system, the I/O command being a read command, the query including a request for read data;

opening an Application Programming Interface (API) via a first storage controller connected to the first storage tier, the first storage tier including a solid-state drive (SSD);

providing the query to the first controller via the host mapper;

receiving the query via a cache engine of the first controller;

when the requested read data is at least one of: located in a cache of the first controller, or located on a SSD connected to the first controller, retrieving the requested read data and providing the requested read data to the host mapper in response to the query; and when the requested read data is not at least one of: located in the cache of the first controller, or located on the SSD connected to the first controller, providing a request from the host mapper to the second controller for obtaining the requested read data, the second controller being connected to at least one hard disk drive (HDD).

13. A non-transitory, computer-readable medium having computer-executable instructions for performing a method as claimed in claim 12, said method further comprising:

when the requested read data is provided by the first controller, receiving the requested read data via the host mapper and directing the requested read data to the host.

14. A non-transitory, computer-readable medium having computer-executable instructions for performing a method as claimed in claim 12, said method further comprising:

when the requested read data is not at least one of: located in the cache of the first controller, or located on the SSD connected to the first controller, providing a message to the host mapper indicating a cache miss in response to the query, the message being provided by the cache engine.

15. A non-transitory, computer-readable medium having computer-executable instructions for performing a method as claimed in claim 14, said method further comprising:

receiving the cache miss message via the host mapper.

16. A non-transitory, computer-readable medium having computer-executable instructions for performing a method as claimed in claim 15, wherein the providing a request from the host mapper to the second controller for obtaining the requested read data, the second controller being connected to at least one hard disk drive (HDD) includes:

in response to receiving the cache miss message from the first controller, providing a request from the host mapper to the second controller for obtaining the requested read data, the second controller being connected to at least one hard disk drive (HDD).

17. A non-transitory, computer-readable medium having computer-executable instructions for performing a method as claimed in claim 16, said method further comprising:

when the requested read data is at least one of: located in a cache of the second controller, or located on a hard disk drive (HDD) connected to the second controller, receiving the requested read data from the second controller via the host mapper and directing the requested read data to the host.

18. A non-transitory, computer-readable medium having computer-executable instructions for performing a method as claimed in claim 17, said method further comprising:
when the cache miss message indicates to provide a copy of the requested read data obtained from the second controller to the first controller, providing the copy of the requested read data to the first controller via the host mapper.

19. A non-transitory, computer-readable medium having computer-executable instructions for performing a method as claimed in claim 18, said method further comprising:
receiving the copy of the requested read data via the cache engine of the first controller.

\* \* \* \* \*